(12) United States Patent
Natanzon et al.

(10) Patent No.: US 10,108,356 B1
(45) Date of Patent: Oct. 23, 2018

(54) DETERMINING DATA TO STORE IN RETENTION STORAGE

(71) Applicant: EMC Corporation, Hopkinton, MA (US)

(72) Inventors: Assaf Natanzon, Tel Aviv (IL); Kirill Shoikhet, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/081,137

(22) Filed: Mar. 25, 2016

(51) Int. Cl.
*G06F 12/00* (2006.01)
*G06F 3/06* (2006.01)

(52) U.S. Cl.
CPC ............ *G06F 3/0619* (2013.01); *G06F 3/065* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |
| 8,495,304 B1 | 7/2013 | Natanzon et al. | |
| 8,510,279 B1 | 8/2013 | Natanzon et al. | |

(Continued)

*Primary Examiner* — Prasith Thammavong
*Assistant Examiner* — Jason W Blust
(74) *Attorney, Agent, or Firm* — Daly, Crowley Mofford & Durkee, LLP (57) ABSTRACT

In one aspect, a method includes generating a protection file system in a deduplication storage array, generating a snapshot of a production volume in the deduplication storage array including hashes of data in the snapshot, generating a first file hierarchy for the hashes of the data in the snapshot in the protection file system and adding a retention indicator to each hash in the first file hierarchy.

14 Claims, 5 Drawing Sheets

(56) References Cited

U.S. PATENT DOCUMENTS

| | | |
|---|---|---|
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,563,517 B1 * | 2/2017 | Natanzon ............ G06F 11/1464 |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 2014/0201171 A1 * | 7/2014 | Vijayan ............ G06F 17/30156 707/692 |

\* cited by examiner

DETERMINING DATA TO STORE IN RETENTION STORAGE

BACKGROUND

Computer data is vital to today's organizations and a significant part of protection against disasters is focused on data protection. As the cost of solid-state memory has decreased, organizations may be able to afford systems that store and process terabytes of data.

Conventional data protection systems may include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

Most of the modern storage arrays provide snapshot capabilities. These snapshots allow a user to save or freeze an image of a volume or set of volumes at some point-in-time and to restore this image when needed.

SUMMARY

In one aspect, a method includes generating a protection file system in a deduplication storage array, generating a snapshot of a production volume in the deduplication storage array including hashes of data in the snapshot, a first file hierarchy for the hashes of the data in the snapshot in the protection file system and adding a retention indicator to each hash in the first file hierarchy.

In another aspect, an apparatus, includes electronic hardware circuitry configured to generate a protection file system in a deduplication storage array, generate a snapshot of a production volume in the deduplication storage array including hashes of data in the snapshot, generate a first file hierarchy for the hashes of the data in the snapshot in the protection file system and add a retention indicator to each hash in the first file hierarchy.

In a further aspect, an article includes a non-transitory computer-readable medium that stores computer-executable instructions. The instructions cause a machine to generate a protection file system in a deduplication storage array, generate a snapshot of a production volume in the deduplication storage array including hashes of data in the snapshot, generate a first file hierarchy for the hashes of the data in the snapshot in the protection file system and add a retention indicator to each hash in the first file hierarchy.

DETAILED DESCRIPTION

Described herein are techniques to save data to a protection storage as a file and, when the data is no longer needed, the data may be moved to a retention storage. In some examples, the data that are saved as files may include hashes of data in a production volume and/or hashes of one or more hashes. In some examples, the retention storage may be less expensive to purchase than the protection storage.

While the description herein describes taking snapshots of a volume, the techniques described herein may be applied to multiple volumes such as, for example, taking a snapshot of a logical unit that includes one or more volumes.

Figure 1:
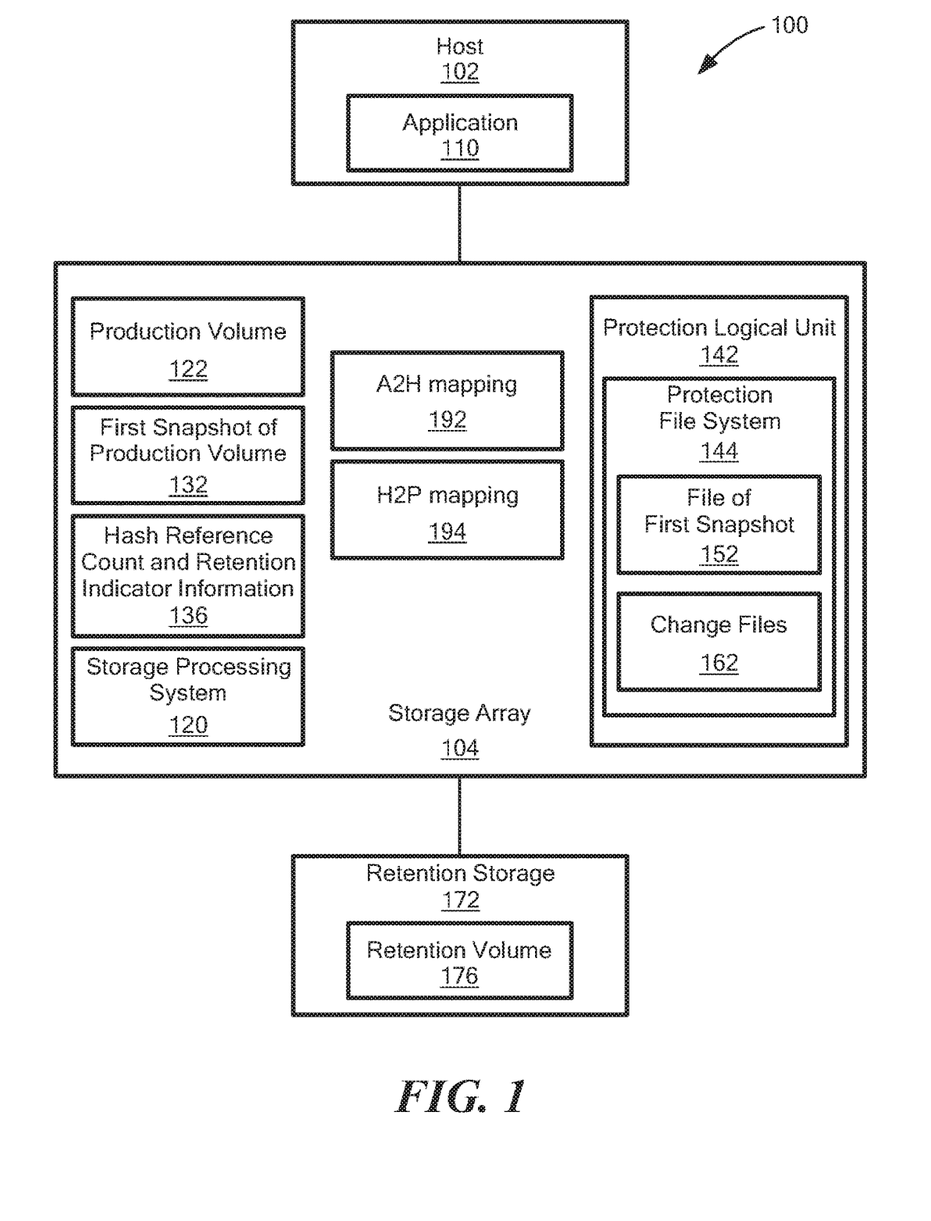
FIG. 1 is a block diagram of an example of a system to store data, according to one embodiment of the disclosure.

Referring to FIG. 1, a system 100 is an example of a system to store data, according to one embodiment of the disclosure. The system 100 may include a host 102, a storage array 104 and retention storage 172.

The host 102 may include an application 110. The storage array 104 may include a storage processing system (SPS) 120, a production volume 122, snapshots of the production volume (e.g., a snapshot of production volume 132), a hash reference count and retention indicator information 136, and a protection logical unit 142. In some examples, the data generated by using the application 110 may be stored on the production volume 122.

The protection logical unit 142 may include a protection file system 144. The protection file system 144 may save hashes of data describing snapshots of logical units of the storage array 104 such as, for example, snapshot 132 as files. For example, the file system 144 may save a file of the first snapshot 152 as one or more files in a file hierarchy. In another example, the protection file system 144 may save changes to the production volume 122 since the first snapshot 152 was taken in change files 162. In other embodiments, if the snapshot is generated as a set of files as described in FIGS. 3 and 4, for example, then the snapshots are kept as files and there is no need for a differential file. For example, some new hash files are generated and the root of the hierarchy is a full description of the second snapshot.

In one example, storage array 104 may save each block of data as a hash. In one particular example, the blocks of data are 8 KB in size. In one particular example, a hash includes a Secure Hash Algorithm 1 (SHA-1) hash. In one example, the storage array 104 may be a deduplicated storage array so that each of the data in the storage array may be kept in separate levels. Accordingly, in such examples, in a first level, each volume may include a set of pointers from address-to-hash value of the data address (e.g. in an address-to-hash (A2H) mapping 192), which may be kept in a compact format, for example. Further, in such examples, a second level of mapping includes, for example, a map from hash-to-the physical location (e.g., in a hash-to-physical mapping (H2P) 194) where the data matching the hash value is stored.

In some examples, A2H mappings 192 and H2P mappings 194 may each be maintained using one or more tables. It will be appreciated that, in certain embodiments, combinations of the A2H and H2P tables may provide multiple levels of indirection between the logical (or "I/O") address used to access data and the physical address where that data is stored. Among other advantages, this may allow storage system 100 freedom to move data within the storage 104.

In some examples, for each hash there is also a hash reference count which counts the number of references to the data to which the hash points. If the exact same data is used again later on the storage array 104, then the hash is not saved again but another pointer is added to point to the hash. In some examples, the system 100 periodically takes a snapshot of the production volume 122 to form, for example, the snapshot 132.

In one example, the hash reference count and retention indicator information 136 includes reference counts for each hash value, and has a pointer from each hash value to its physical location. In one example, each hash reference count value represents a number of entities (e.g., journals, tables) that rely on and use the hash value. In one particular example, a hash reference count of '0' means no entities in the storage array are using the hash value and the data to which the hash points may be erased. In a preferred embodiment, the hash count is incremented for each entity that uses the hash. In some examples, the system 100 may be configured so that a hash reference counter counts up or counts down for each new entity that depends on the hash value and the hash reference count value may start at any value. For example, the counter may track a number of entities that depend on the hash value as new entities are added to and deleted from the storage array 104.

In one example, the hash reference count and retention table 136 also includes a retention indicator for each hash value. In one example, the retention indicator may indicate that the hash may be part of a retention policy (e.g., designated for retention) and should not be erased from the system 100. In one particular example, the retention indicator is a retention bit and a retention bit of '1' indicates retain the hash while a retention bit of '0' indicates not to retain the hash. In one example, even though a reference count is zero for a hash, if the retention indicator indicates that the hash should be retained, the hash is moved to the retention storage 172.

In one particular example, the reference count and retention indicator information 136 may be included with the H2P mapping.

The retention storage 172 may include a retention volume 176, which may store the data designated for retention.

In one example, the storage array 104 may include a flash storage array. In other examples, the storage array 104 may include a deduplication device. In other examples, the storage array 104 may be part of a device used for scalable data storage and retrieval using content addressing. In one example, the storage array 104 may include one or more of the features of a device for scalable data storage and retrieval using content addressing described in U.S. Pat. No. 9,104,326, issued Aug. 11, 2015, entitled "SCALABLE BLOCK DATA STORAGE USING CONTENT ADDRESSING," which is assigned to the same assignee as this patent application and is incorporated herein in its entirety. In other examples, the storage array 104 may include a flash storage array used in EMC® XTREMIO®.

Figure 2:
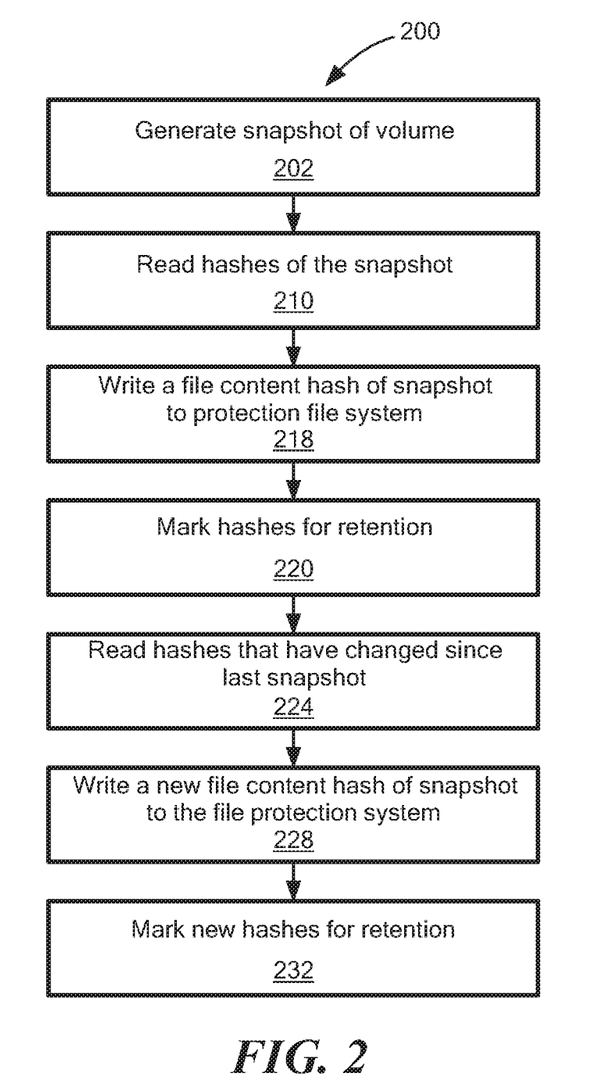
FIG. 2 is a flowchart of an example of a process to store snapshots in a file system, according to one embodiment of the disclosure.

Referring to FIG. 2, a process 200 is an example of a process that may store snapshots in a file system according to one embodiment of the disclosure. In one example, the snapshot may include a file stored on the file system (e.g., protection file system 144 (FIG. 1)).

Process 200 may generate a snapshot of the volume (202). For example, a snapshot of the production volume 122 may be taken and saved as the first snapshot 132.

Process 200 may read the hashes of the snapshot (210) and may write a file content hash of the snapshot to a protection file system (218). In one example, the file content hash may be a hash of composite hashes, which may be hashes of other composite hashes and so forth to a last level of hashes, which are hashes of the underlying data blocks. In one particular example, a file content hash may be generated similar to a file content hash 302 described in FIG. 3.

Process 200 may mark hashes for retention (220). In one example, a volume is designated for retention. In one particular example, a file content hash and each of the hashes that form the file content hash may be marked with a retention indicator indicating that the data for which the hash is derived should be retained, for example, in the retention storage 172 when the hash is no longer used in the storage array 104 (e.g., the reference count is zero). Once a first copy of a snapshot is generated in the protection file system, the process 200 may repeat itself and a new snapshot of the production volume is generated, and then process 200 may read hashes that have changed since the last snapshot (224) and may write a new file content hash of each snapshot to the file protection system (228). In one example, the production volume 122 may change from the first snapshot 132 because writes are added to the production volume after the first snapshot 132 was generated. In one example, not all of the hashes that are used to generate the file content hash will have changed from the first snapshot, but only those hashes affected by the change in data. The hashes that have changed since the last snapshot may be saved as files (e.g., change files 162). In one particular example, a new file content hash may be generated similar to a file content hash 402 described in FIG. 4 with only a subset of the original hashes from FIG. 3 being changed.

Process 200 may mark new hashes for retention (232). In one particular example, the new file content hash and each of the hashes that form the new file content hash that have changed may be marked with a retention indicator indicating that the data for which the hash is derived should be retained, for example, in the retention storage 172 when the hash is no longer used by the A2H mappings 192 in the storage array 104 (e.g., the reference count is zero). In one embodiment, no data is being moved while hash files are generated, as the data is already in the hash table of the array.

Figure 3:
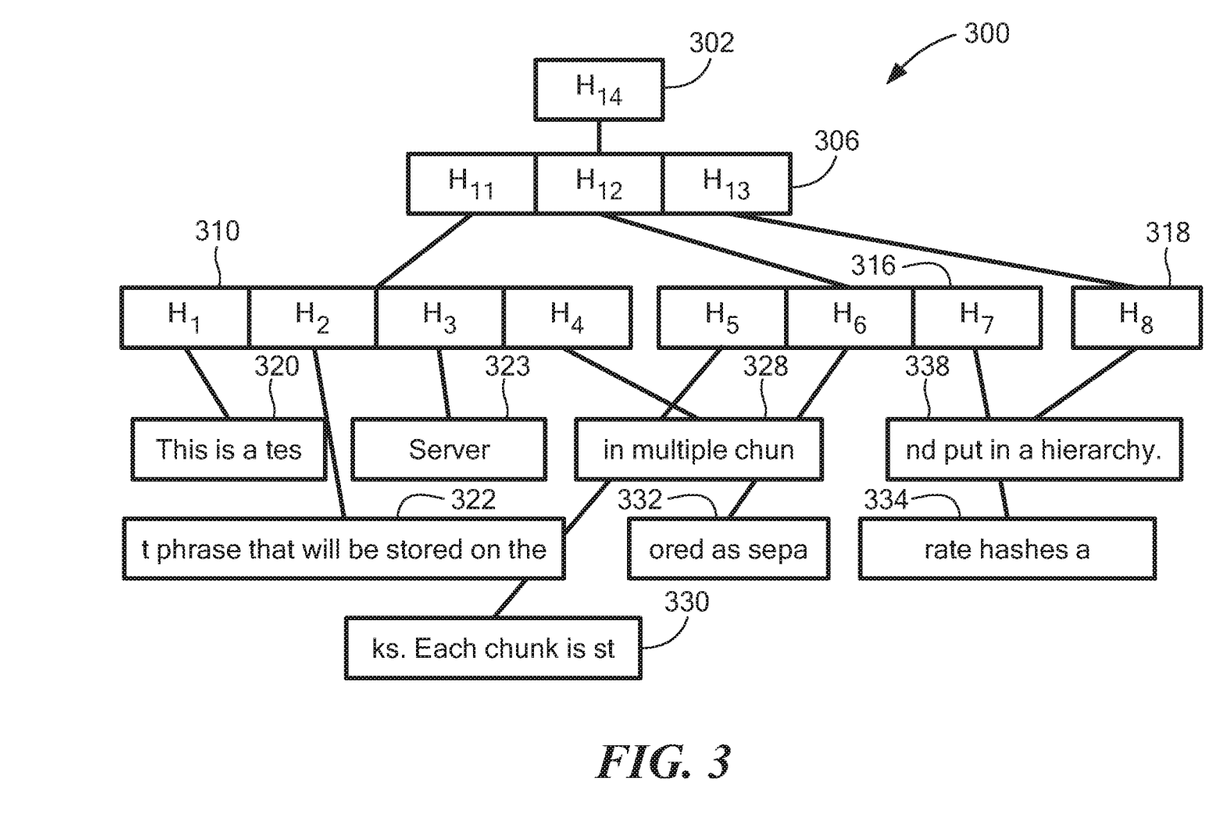
FIG. 3 is a block diagram of an example of a file hierarchy, according to one embodiment of the disclosure.

FIG. 3 depicts an example of a file hierarchy 300 of a file content hash 302, according to one embodiment of the disclosure. The file content hash 302 may be a file. In one example, the file content hash 302 may represent a volume of data (e.g., from the first snapshot 132). The file content hash 102 may include at least a hash, $H_{14}$, of a composite of hashes that may include at least $H_{11}$, $H_{12}$ and $H_{13}$ included in a composite file 306.

The hash, $H_{11}$, may be a hash of a composite of hashes that include at least $H_1$, $H_2$, $H_3$ and $H_4$ included in a composite file 310. The hash, $H_{12}$, may be a hash of a composite of hashes that include at least hashes $H_5$, $H_6$ and $H_7$ included in a composite file 316. The hash, $H_{13}$, may be a hash of a composite of hashes that include hashes $H_8$ included in a composite file 318.

The hash, $H_1$, may be a hash of at least a data block 320. The hash, $H_2$, may be a hash of at least a data block 322. The hash, $H_3$, may be a hash of at least a data block 323. The hash, $H_4$, may be a hash of at least a data block 328. The hash, $H_5$, may be a hash of at least a data block 330. The hash, $H_6$, may be a hash of at least a data block 332. The hash, $H_7$, may be a hash of at least a data block 334. The hash, $H_8$, may be a hash of at least a data block 338.

In this example, the data blocks 320, 322, 323, 328, 330, 332, 334, 338 include data that include the following data: "This is test phrase that will be stored on the Server in multiple chunks. Each chunk is stored as separate hashes and put in a hierarchy."

In the example in FIG. 3, the file hierarchy 300 is depicted as having four levels as an example. For example, a first level includes a hash $H_{14}$; a second level includes hashes $H_{11-13}$; a third level includes hashes $H_{1-8}$; and a fourth level includes data blocks 320, 322, 323, 328, 330, 332, 334, 338. The number of levels in any file hierarchy may depend, for example, on a size of each file, a size of each hash and the amount of storage space occupied by the files in the file hierarchy. In one particular example, if a file is 8 KB and every hash is 20 bytes, then the file content hash may include about 400 hash signatures of the hashes below in the file hierarchy. In this particular example, if each file below the file content hash includes hashes of the layers below, then the file hierarchy will have one level for files up to about 3.2 MB, two levels for files up to about 1.2 GB, three levels for files up to about 400 GB, four levels for files up to 1.6 TB and so forth.

Figure 4:
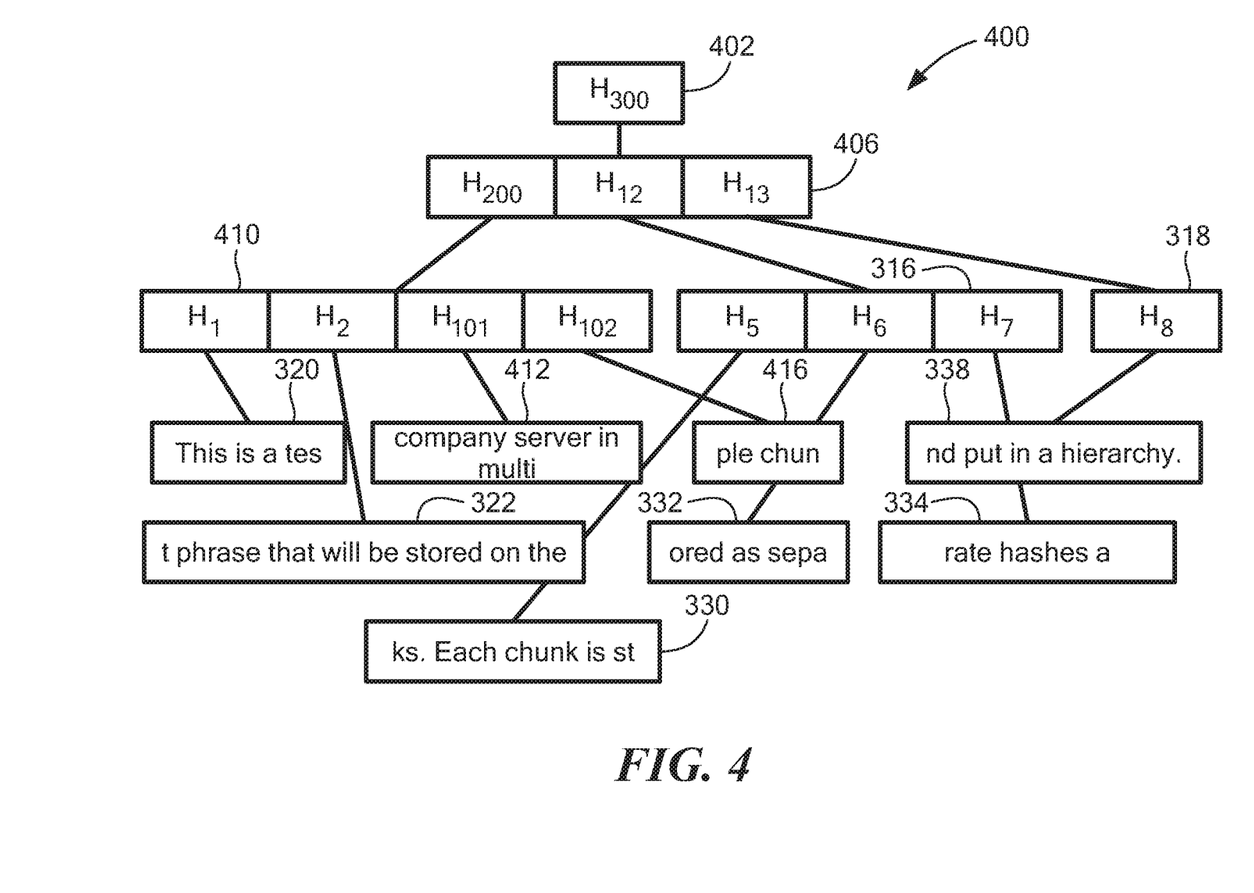
FIG. 4 is a block diagram of an example of a file hierarchy after data from the file hierarchy of FIG. 3 has changed, according to one embodiment of the disclosure.

FIG. 4 depicts an example of a file hierarchy 400 of a file content hash 402, according to one embodiment of the disclosure. The file hierarchy 400 may reflect changes to the underlying data of file hierarchy 300 of FIG. 3. In particular, data blocks 323, 328 from file hierarchy 300 may have been replaced with data blocks 412, 416 respectively in file hierarchy 400. In this example, the data blocks 320, 322, 412, 416, 330, 332, 334, 338 include data that include the following data: "This is test phrase that will be stored on the company server in multiple chunks. Each chunk is stored as separate hashes and put in a hierarchy."

With the new data blocks 412, 416 the corresponding dependent hashes are changed. In particular, the hash, $H_3$, of FIG. 3 may be replaced with a hash, $H_{101}$, which may be a hash of at least a data block 412. The hash, $H_4$, of FIG. 3 may be replaced with a hash, $H_{102}$, which may be a hash of at least a data block 416. The composite file 310 of FIG. 3 may be replaced with a composite file 410, which may include at least hashes $H_1$, $H_2$, $H_{101}$ and $H_{102}$. The hash, $H_{11}$, of FIG. 3 may be replaced with a hash, $H_{200}$, which may be a hash of at least the composite of hashes that may include at least $H_1$, $H_2$, $H_{101}$ and $H_{102}$. The composite file 306 of FIG. 3 may be replaced with a composite file 406, which may include at least the hashes $H_{200}$, $H_{12}$ and $H_{13}$. The file content hash 302 of FIG. 3 may be replaced with a file content hash 402, which may include at least a hash $H_{300}$ which may be a hash of a composite of hashes that may include at least $H_{200}$, $H_{12}$ and $H_{13}$ from hash composite file 406.

Figure 5:
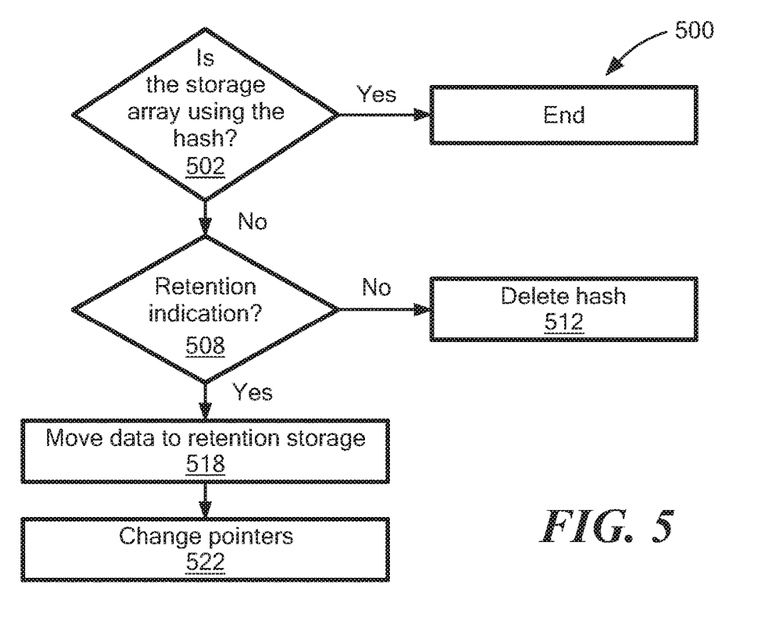
FIG. 5 is a flowchart of an example of a process to determine hashes to store in a retention storage, according to one embodiment of the disclosure.

Referring to FIG. 5, a process 500 is an example of a process to move data into retention storage, in accordance to an embodiment of the disclosure. For example, data may be moved from the protection file system 144 to the retention storage 172.

Process 500 may determine whether the storage array (e.g., storage array 104) is using a hash (502). For example, process 500 determines whether the hash is being used in a A2H mapping 192, and the hash points to some physical data on the storage. For example, the process 500 may determine whether a reference count for the hash is zero or not. In one particular example, for each hash, a reference count may be read from the hash reference count and retention indicator table 136.

If the storage array is no longer using the hash (e.g., a reference count is zero), process 500 may determine if retention is indicated (508). In one example, a retention indicator may be assigned to the hash and the retention indicator may indicate whether the hash should be retained or not in retention storage 172. In one particular example, a retention indicator is assigned to the hash in the hash reference count and retention indicator table 136.

If retention is not indicated, process 500 may delete the hash (512). For example, the retention indicator indicates that the hash should be erased from the system 100 and the data is not to be saved in the retention storage 172. In one example, once the hash is deleted the data associated with the hash may also be deleted from the physical storage.

If retention is indicated, process 500 may move data to retention storage (518). For example, the retention indicator indicates that the data should be saved and the data is saved in the retention storage 172. In one example, the data is moved to the retention volume 176.

Process 500 changes pointers to the data (522). For example, pointers to the hash in a H2P mapping may be erased and may be changed to include pointer from the hash files in the protection file system 144 to the location of the hash data in the retention storage 172. Once data is moved to the retention storage it may be erased from the primary storage.

In some embodiments, a volume may be recovered from the retention storage 172. For example, a new volume is generated in the storage array 104. For every location for which a hash exists, an A2H mapping 192 may be updated to point to the hash and other locations are read from the retention storage 172 and written to the storage array 104. In some examples, the hash value is copied to the H2P mapping 192 and a copy of the actual data from the retention storage 172 is copied to the new volume.

In other embodiments, a volume may be recovered using a virtual mode (e.g., virtual access). In one example, a new volume is generated on the storage array 104 and the new volume is empty. In a preferred embodiment, the empty volume is initially an empty device. Further, in certain embodiments, writes that are received for the new volume are written to the new volume. Likewise, in certain embodiments, a read command to read data from the new volume reads the data from the new volume if the data exists in the new volume. However, in certain embodiments, if the data does not exist in the new volume, the file system 144 is checked using the offset of the read for the location of the hash. Accordingly, in certain embodiments, if the hash is in the storage array 104, the H2P mappings 194 are used to locate the hash. Therefore, in certain embodiments, if the hash is in the retention storage 172, the hash is retrieved from the retention storage 172.

Figure 6:
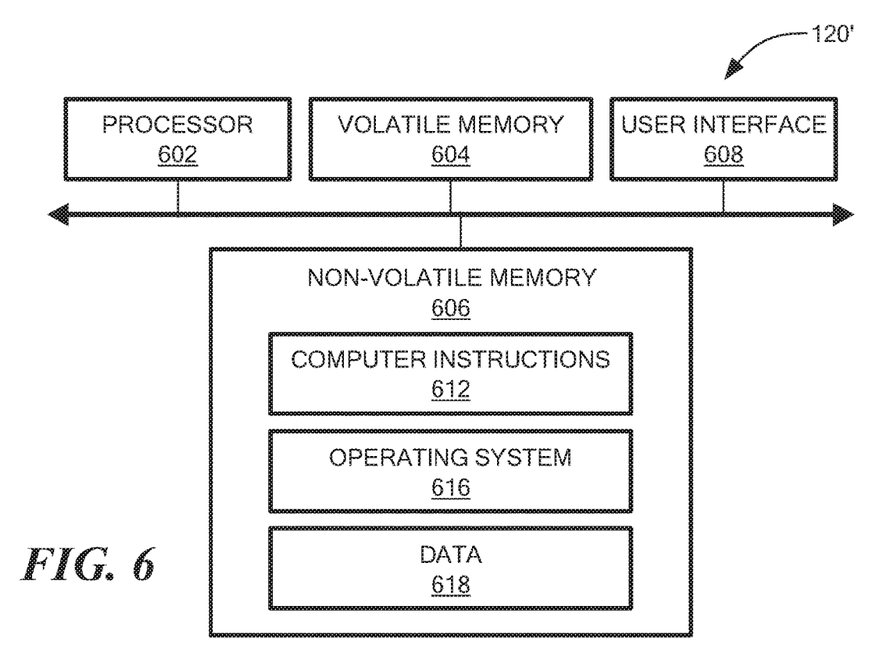
FIG. 6 is a block diagram of an example of a computer on which any portion of the processes of FIGS. 2 and 5 may be implemented, according to one embodiment of the disclosure.

Referring to FIG. 6, in one example, the SPS 120 (FIG. 1) may include a SPS module 120', according to one embodiment of the disclosure. In one example, the SPS module 120' may include a processor 602, a volatile memory 604, a non-volatile memory 606 (e.g., flash memory, hard disk and so forth) and the user interface (UI) 608 (e.g., a graphical user interface, a mouse, a keyboard, a display, touch screen and so forth). The non-volatile memory 606 stores computer instructions 612, an operating system 616 and data 618, which may include, for example, hash reference count and retention indicator information. In one example, the computer instructions 612 may be executed by the processor 602 out of volatile memory 604 to perform any portion of the processes described herein (e.g., processes 200 and 500).

The processes described herein (e.g., processes 200 and 500) are not limited to use with the hardware and software of FIG. 6; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200 and 500 are not limited to the specific processing order of FIGS. 2 and 5, respectively. Rather, any of the processing blocks of FIGS. 2 and 5 may be re-ordered, combined or removed, performed in parallel or in serial, as necessary, to achieve the results set forth herein.

The processing blocks (for example, in the processes 200 and 500) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method comprising:
    generating a protection file system in a deduplication storage array;
    generating a snapshot of a production volume in the deduplication storage array, the snapshot including the data and hashes of the data in the snapshot;
    generating a first file hierarchy for the hashes of the data in the snapshot in the protection file system;
    adding a retention indicator to each hash in the first file hierarchy, the retention indicator denoting retaining the hash even when a reference count for the hash is zero; and
    recovering the production volume comprising:
    generating a virtual volume;
    after receiving a read command to read data from the virtual volume:
        reading the data from the protection file system when the hash of the data exists in the deduplication storage array;
        reading the data from the retention storage when the hash of the data does not exist in the deduplication storage array;
    after receiving a write command to write data to the virtual volume:
        writing the data to be written to the production volume;
        marking the hash of the data to be written with a retention indicator; and
        updating a pointer of the hash of the data to be written in the protection file system.

2. The method of claim 1, further comprising moving a hash in the first file hierarchy from the deduplication storage array to a retention storage if the deduplication storage array no longer uses the hash and if the retention indicator indicates retention.

3. The method of claim 1, further comprising:
    generating a second snapshot of the production volume; and
    generating a second file hierarchy indicating changes from the first file hierarchy.

4. The method of claim 1, further comprising determining if the deduplication storage array no longer uses the hash in an address-to-hash mapping,
    wherein determining if the deduplication storage array no longer uses the hash comprises determining if a reference count is zero.

5. The method of claim 1, further comprising adding a retention indicator for each new hash generated.

6. An apparatus, comprising:
    electronic hardware circuitry configured to:
        generate a protection file system in a deduplication storage array;
        generate a snapshot of a production volume in the deduplication storage array including the data and hashes of the data in the snapshot;
        generate a first file hierarchy for the hashes of the data in the snapshot in the protection file system;
        add a retention indicator to each hash in the first file hierarchy, the retention indicator denoting retaining the hash even when a reference count for the hash is zero; and
        recover the production volume, comprising:
        generate a virtual volume;

after receiving a read command to read data from the virtual volume:
  read the data from the protection file system when the hash of the data exists in the deduplication storage array; or
  read the data from the retention storage when the hash of the data does not exist in the deduplication storage array;
after receiving a write command to write data to the virtual volume:
  write the data to be written to the production volume;
  mark the hash of the data to be written with a retention indicator; and
  update a pointer of the hash of the data to be written in the protection file system.

7. The apparatus of claim 6, further comprising circuitry configured to move a hash in the first file hierarchy from the deduplication storage array to a retention storage if the deduplication storage array no longer uses the hash and if the retention indicator indicates retention.

8. The apparatus of claim 6, further comprising circuitry configured to:
generate a second snapshot of the production volume; and
generate a second file hierarchy indicating changes from the first file hierarchy.

9. The apparatus of claim 6, further comprising circuitry configured to determine if the deduplication storage array no longer uses the hash,
wherein the circuitry configured to determine if the deduplication storage array no longer uses the hash comprises circuitry configured to determine if a reference count is zero.

10. The apparatus of claim 6, further comprising circuitry configured to add a retention indicator for each new hash generated.

11. An article comprising:
a non-transitory computer-readable medium that stores computer-executable instructions, the instructions causing a machine to:
  generate a protection file system in a deduplication storage array;
  generate a snapshot of a production volume in the deduplication storage array including the data and hashes of the data in the snapshot;
  generate a first file hierarchy for the hashes of the data in the snapshot in the protection file system;
  add a retention indicator to each hash in the first file hierarchy, the retention indicator denoting retaining the hash even when a reference count for the hash is zero; and
  recover the production volume comprising:
    after receiving a read command to read data from the virtual volume:
      read the data from the protection file system if the hash of the data exists in the deduplication storage array; or
      read the data from the retention storage if the hash of the data does not exist in the deduplication storage array;
    after receiving a write command to write data to the virtual volume:
      write the data to be written to the production volume;
      mark the hash of the data to be written with a retention indicator, the retention indicator denoting retaining the hash even when a reference count for the hash is zero; and
      update a pointer of the hash of the data to be written in the protection file system.

12. The article of claim 11, further comprising instructions causing the machine to move a hash in the first file hierarchy from the deduplication storage array to a retention storage if the deduplication storage array no longer uses the hash and if the retention indicator indicates retention.

13. The article of claim 11, further comprising instructions causing the machine to:
generate a second snapshot of the production volume;
generate a second file hierarchy indicating changes from the first file hierarchy; and
add a retention indicator for each new hash generated.

14. The article of claim 11, further comprising instructions causing the machine to determine if the deduplication storage array no longer uses the hash,
wherein the instructions causing the machine to determine if the deduplication storage array no longer uses the hash comprises instructions causing the machine to determine if a reference count is zero.

\* \* \* \* \*